United States Patent
Kloft et al.

[11] Patent Number: 6,095,126
[45] Date of Patent: Aug. 1, 2000

[54] METHOD OF PRODUCING A SLIDE SURFACE ON A LIGHT METAL ALLOY

[75] Inventors: Manfred Kloft, Rhode; Reinhard Strich, Braunschweig; Udo Schlegel, Vechelde, all of Germany

[73] Assignee: Volkswagen AG, Wolfsburg, Germany

[21] Appl. No.: 09/067,628

[22] Filed: Apr. 28, 1998

Related U.S. Application Data

[63] Continuation of application No. PCT/EP96/04716, Oct. 30, 1996.

[30] Foreign Application Priority Data

| Oct. 31, 1995 | [DE] | Germany | 195 40 572 |
| Oct. 31, 1995 | [DE] | Germany | 195 49 403 |
| Dec. 9, 1996 | [DE] | Germany | 196 37 041 |

[51] Int. Cl.$^7$ ................................................. F01K 15/00
[52] U.S. Cl. ........................... 123/668; 75/255; 428/553
[58] Field of Search ................................. 123/193.2, 668; 428/553, 662; 106/1.05; 75/255

[56] References Cited

U.S. PATENT DOCUMENTS

| 2,588,422 | 3/1952 | Shepard | 309/3 |
| 3,620,137 | 11/1971 | Prasse | 92/169 |
| 3,819,384 | 6/1974 | Ingham, Jr. et al. | 79/255 |
| 3,988,119 | 10/1976 | Takahashi et al. | 29/195 |
| 5,032,469 | 7/1991 | Merz et al. | 428/662 |
| 5,080,056 | 1/1992 | Kramer et al. | 123/193 |
| 5,334,235 | 8/1994 | Dorfman et al. | 75/255 |
| 5,484,662 | 1/1996 | Rao | 428/553 |
| 5,592,927 | 1/1997 | Zaluzec et al. | 123/668 |

FOREIGN PATENT DOCUMENTS

| 1933680 | 3/1971 | Germany . |
| 2146153 | 3/1973 | Germany . |
| 2433814 | 1/1976 | Germany . |
| 3524412 | 1/1987 | Germany . |
| 4440713 | 5/1995 | Germany . |
| 195 08 687 | 12/1995 | Germany . |
| 195 06 568 | 8/1996 | Germany . |
| 196 37 737 | 4/1997 | Germany . |
| 53-041621 | 4/1978 | Japan . |
| 59-093865 | 5/1984 | Japan . |
| 1767010 | 10/1992 | U.S.S.R. . |
| 1478287 | 6/1977 | United Kingdom . |
| 2050434 | 1/1981 | United Kingdom . |

OTHER PUBLICATIONS

"Structure and Properties of Arc Sprayed, Steel–Molybdenum Coatings" by Levchenko et al.; 2283 Steel in the U.S.S.R.; 17 (1987) Mar.; No. 3, London. Pp. 148–150.

"Laserhonen für Zylinderlaurbahnen" MTZ Motortechnische Zeitschrift 58 (1977) p. 554–556. By Von Ulrich Klink.

"Harte Schale—Thermisch aufgespritzte Schichten verringern den Verschleiß von hoch beanspruchten Bauteilen"; Maschinenmarkt Würzburg 98 (1992).

"Fachgebiete in Jahresübersichten: Honen" by Von Ulrich Klink, Ostfildern; VDI-Z (1983) Nor. 14—Juli (II) pp. 595–603.

Thermisch gespritzte Schichten: by B. Heine; Metall, 49, Jahrgang, Nr. 1/95 pp. 51–57.

*Primary Examiner*—Noah P. Kamen
*Attorney, Agent, or Firm*—BakerBotts, LLP

[57] ABSTRACT

A method for producing cylinder linings in an aluminum or magnesium engine block for an internal combustion engine utilizes plasma spraying of a mixture of powdered molybdenum and powdered steel containing from about 10 to about 70 wt. % molybdenum and from about 90 to about 30 wt. % steel. The resulting slide layer has good adhesion to the engine block and has high wear resistance.

15 Claims, 1 Drawing Sheet

METHOD OF PRODUCING A SLIDE SURFACE ON A LIGHT METAL ALLOY

This is a continuation of copending application Serial No. PCT/EP96/04716 filed Oct. 30, 1996.

BACKGROUND OF THE INVENTION

This invention relates to methods for producing a slide surface on a light metal alloy and also to reciprocating piston engines such as internal combustion engines having cylinder linings with slide surfaces.

German Offenlegungsschrift No. 44 40 713 discloses a method of producing slide surfaces on cast iron parts consisting of several steps in which lubrication pockets are exposed in a slide surface so as to provide hydrodynamic lubrication in operation. These steps include machining of the slide surfaces and then processing the surfaces with a chemically and electrochemically inactive liquid applied under a pressure suitable for flake removal. By a combination of liquid erosion and frictional smoothing the lubrication pockets are exposed in the slide surface, forming in the aggregate a system of pressure microchambers to provide the requisite hydrodynamic lubrication. These pockets are produced by a honing operation which extracts small titanium carbide and nitride particles from the surface and the craters so formed are closed by further treatment. Liquid erosion and frictional smoothing expose these pockets again.

U.S. Pat. No. 5,080,056 discloses a process in which a substantially pore-free aluminum bronze alloy layer is applied by high velocity flame spraying to parts made of a magnesium alloy, the thickness of the applied alloy layer being then reduced by honing from about 1 mm to a final dimension of about 127 microns.

In contradistinction to the formation of a system of pressure microchambers, it is known that a communicating groove system may be obtained, for example on the surfaces of cylinder liners for internal combustion engines by a honing operation. Such honing produces intersecting scores which are interconnected at the points of intersection and constitute an overall open system. A disadvantage of this system is that the part sliding on the slide surface, for example a piston ring on a piston of an internal combustion engine, will push oil contained in the scores ahead of it, preventing any significant build-up of hydrodynamic oil pressure on the slide surface. Consequently, along the edges of the scores there will be mixed friction between the two materials. The mixed friction lubrication systems which are in widespread use for surfaces of gray iron castings, however, are not applicable to slide surfaces on parts made of a magnesium alloy for reasons of weight.

U.S. Pat. No. 2,588,422 discloses an aluminum engine block having cylinder liners which are formed by thermal spraying. These liners are built up in two layers on the untreated surface of the engine block, the top layer being a hard slide layer such as steel about 1 mm in thickness and the lower layer being a molybdenous interlayer about 50 microns in thickness. The interlayer, containing at least 60% molybdenum, does not constitute a slide layer, but is necessary in order to bind the hard slide layer to the aluminum block. Preferably, the uniting layer is made up of pure molybdenum. The slide layer is a layer of hard metal, as for example carbon steel, bronze or stainless steel, in which the steel may be an alloy containing nickel, chromium, vanadium or molybdenum for example. In principle, this two-layer structure provides a good slide layer, but the cost of the double coating is substantial.

British Published Patent Application No. 2,050,434 discloses various coatings obtained by thermal spraying and having thicknesses from 0.5 to 2 mm. These coatings are formed on steel or cast parts for internal combustion engines, as for example piston rings or cylinder linings. In this case it is found that coatings consisting of equal parts of powdered molybdenum and powdered carbon steel are considerably less abrasion-resistant than coatings containing only 0.5–4.5 wt. % of molybdenum with 20–97 wt. % of metal carbides and possibly iron or ferrous alloys. To bind these coatings to magnesium alloys, the process described above with respect to U.S. Pat. No. 2,588,422 must be used.

British Patent No. 1,478,287 describes a powdered mixture for plasma coating of steel parts or castings such as piston rings, cylinder blocks or cylinder linings to produce layers bearing a thickness of about 762–1270 microns. The powder is a mixture of molybdenum, boron and cast iron containing at least as much cast iron as molybdenum and the boron is usually present is amounts up to 3% of the sum of molybdenum and cast iron. Such coatings, as example 1 of British Published Patent Application No. 2,050,434 A shows, no longer meet present-day performance requirements. Another coating for cylinder liners is disclosed in U.S. Pat. No. 3,620,137 in which a plasma coating containing nickel and chromium, boron, silicon and possibly also iron in addition to at least 65 wt. % molybdenum is described. This coating is intended for cylinder liners made of gray cast iron and exhibits very small pores of 0.1 to 2 microns and an over-all porosity of 15%, corresponding to the coatings described in British Application No. 2,050,434 and British Patent No. 1,478,287.

As described above, various plasma coatings are known for aluminum alloys. The application of the same coatings to magnesium alloys, however, is not possible in principle, because magnesium alloys have a coefficient of heat expansion about ⅓ greater than that of aluminum alloys. Thus, the ratio of the heat expansion coefficients of such plasma coatings to those of magnesium alloys is about 1:3, so that high stresses can be expected between the plasma sprayed layer and the magnesium alloy.

SUMMARY OF THE INVENTION

Accordingly, it is an object of the present invention to provide a method for producing a slide surface on a light metal alloy which overcomes disadvantages of the prior art.

Another object of the invention is to provide a method of producing a slide surface on a magnesium or aluminum alloy in which a single coating operation is sufficient.

A further object of the invention is to provide a reciprocating piston engine having an engine block made of a magnesium or aluminum alloy with improved slide surfaces.

These and other objects of the invention are attained by thermal spraying a coating of a mixture containing about 10 to 70 weight percent molybdenum and about 90 to 30 weight percent steel, and preferably about 20 to 60 weight percent molybdenum and about 80 to 40 weight percent steel, onto the surface of a magnesium or aluminum alloy. Thereafter, the coating is machined by honing or the like to form the slide surface. In one embodiment the slide surface is on a cylinder lining in the cylinders of an internal combustion engine in an aluminum or magnesium engine block.

Magnesium alloys on which such slide surfaces are produced usually contain at least 20 wt. % magnesium and preferably magnesium is the chief constituent of the alloy. The situation is much the same for aluminum alloys.

Even though a magnesium alloy has a coefficient of heat expansion of about $27\times10^{-6}$ $K_{-1}$ and an aluminum alloy has a coefficient of about $21\times10^{-6}$ $K_{-1}$ while the coating applied according to the invention has a coefficient of about $10\times10^{-6}$ $K_{-1}$, the coatings according to the invention provide good adhesion to such light metal alloys. It has been found that, with such molybdenous coatings, some roughness of the light metal alloy surface will provide a good bond between the light metal alloy and the applied coating. For especially good bonding, it is preferable to determine the best depth of roughness for the light metal alloy surface by a series of tests with the particular light metal alloy and molybdenous coating. Likewise, it is preferable to optimize the spray conditions for good bonding by a series of tests, as is the practice in conventional spray plasma technology. Thus, for example, in the use of powders as spray media, the powder particle size, the ratio of molybdenum to steel, and also the type of steel may be varied, in which case optimal results can be achieved with only a few trials.

The method according to the invention provides a pressure microchamber system in a comparatively simple manner by applying a wear layer of light metal alloy to a part by thermal spraying as described for example in German Standard DIN 32530, October 1989, and then partly removing the layer by machining, exposing lubrication pockets for the microchamber system by outbreaking particles and/or opening of pores. This produces a slide surface on the coated light metal alloy part which has an adequate wear resistance not provided by the light metal alloy. The thermal spraying and the ensuing machining produce a multitude of openings in the coating surface which are healed slightly only during machining, and consequently produce an adequate number of cavities to form the microchamber system.

The pressure microchamber system on the slide surface is thus formed in an entirely different manner from the aforementioned prior art which necessarily relies upon the presence of titanium components.

In a preferred embodiment of the invention, the wear layer is applied by plasma spraying, in particular atmospheric plasma sprayings. Openings produced in the surface of the layer during subsequent honing of the wear layer result in a system of pressure microchambers in the coating surface.

The high-velocity flame spraying proposed in U.S. Pat. No. 5,080,056 cannot be used in many cases, for example in the production of cylinder liners for internal combustion engines, because the comparatively high energy input could cause the cylinder liners to warp.

The method according to the invention advantageously avoids any contaminating galvanic step. By use of suitable metal powders for plasma spraying and suitable honing procedures, extremely smooth slide surfaces can be created with extremely low roughness depths, producing the desired pressure microchamber system for hydrodynamic lubrication.

According to the present invention, it has been found that a mixture of powdered steel with powdered molybdenum is especially suitable for thermal spraying to obtain slide surfaces on magnesium alloys. This mixture preferably consists of about 10–70% powdered molybdenum and about 90–30% powdered steel, with about 20–50% powdered molybdenum and about 80–50% powdered steel being especially preferred. If desired, the mixture may be supplemented with additional components, preferably constituting less than 50 wt. % of the total mixture. One of the most favorable mixtures has been found to be a 50:50 mixture of steel and molybdenum powders. Even though such mixtures coated on cast iron substrates in the prior art lead only to moderately hard, i.e. not wear-resistant, coatings, as described in British Patent No. 2,050,434, such a coating is extraordinarily adherent to light metal alloys, and is highly abrasion resistant when provided with a system of pressure microchambers. Thus, according to the invention, the slide surface is formed on a layer deposited directly on the light metal alloy, requiring no interlayer as is necessary for aluminum according to U.S. Pat. No. 2,588,422. Thus, a unique feature of the present invention is that a wear-resistant layer can be applied with direct bonding to the comparatively soft substrate of a light metal alloy. Another improvement provided by the invention is the coating of cylinders in light metal engine blocks of a reciprocating piston engine to produce wear-resistant slide surfaces using the method.

In thermal spraying of coating layers according to the invention, a plasma spray is preferably employed, and the mixture of metal to be sprayed is preferably in the form of a powder. Since the powder sprayed onto the surface of the part is at least incipiently molten during spraying, maintenance of a certain particle size distribution is advantageous to the quality of the resulting coating. The appropriate particle morphology may conveniently be determined in series of tests with the particular plasma burner to be used.

For use in preparing wear-resistant slide surfaces according to the present invention, conventional steels have proved especially advantageous, and as in conventional plasma spraying, the properties of the steel are optimally determined by a series of tests. Even with conventional steels, good adhesion of the wear layer to the light metal substrate is achieved.

Other advantageous criteria for production of a coating according to the invention are the application parameters and the substrate to which the coating is applied. Pretreatment of the substrate surface to be coated is especially advantageous, roughening preferably being achieved not by grinding but by application of a particle or fluid stream. Roughening of the surface prior to plasma coating is known in principle, but is often omitted in the case of light metal substrates, especially aluminum alloys, in favor of a simple cleaning of the surface.

Other advantageous spray parameters according to the invention are the porosity and the oxide content of the coating, the production of predominantly closed isolated pores and an advantageous range of pore diameters. According to U.S. Pat. No. 3,620,137 porosities ranging from practically pore-free to about 15% are possible and porosities of about 15% have been obtained by spraying molybdenous coatings on gray castings. According to the invention, however, it has been ascertained that when using such high porosities, excessive oil consumption occurs in engine operation. In principle, it is advantageous if the pores are predominantly closed, i.e., isolated rather than connected to each other, and lie within a definite size range. This requirement also differentiates the invention from the disclosure of U.S. Pat. No. 3,620,137 in which the pores are open so as to communicate with each other because of their high volume ratio and the majority of the pores have sizes in a range from 0.1 to 2 microns. Such pores have been found to be not very suitable for the construction of a pressure microchamber system with molybdenum-steel coatings according to the invention.

In principle, coatings of steel in combination with molybdenum are known in the British Published Application No. 2,050,434, but in that case such a mixture produces very poor results on iron substrates. On the other hand, such plasma coatings are especially advantageous on light metal alloys especially in combination with a pressure microchamber system. Preferably, in addition to carbon, the steel used in the coating contains at least one and desirably at least two of the elements Cr, Si, Mo, W, Mn and B.

The molybdenum employed in the present invention may be pure molybdenum or a molybdenum alloy or mixture. Such alloys or mixtures preferably contain more than 50 wt. % molybdenum, and the other constituents of the alloy or mixture may in principle include any metal that will combine with molybdenum. Advantageously, the proportion of molybdenum in the alloys or mixtures is at least 60 wt. %. Examples of appropriate molybdenum alloys are molybdenum-tungsten and molybdenum-iron, and all proportions within the above-mentioned limits are potentially useful.

The molybdenum and the steel are preferably in powdered form. Better results are obtained in this way than by conventional wire feeding of the coating materials to be sprayed.

The invention may in principle be practiced using all light metal alloys, the following aluminum and magnesium alloys being especially suitable:

$AlSi_6Cu_4$

AZ 91, with 9% Al and 1% Zn

AS 21, with 2% Al and 1% Si

AE 42, with 4% Al and 2% rare earths

In accordance with the invention, slide layers may be bound with special strength to the walls of cylinder bores in a light metal engine block of an internal combustion engine and in an environmentally sound manner. These slide layers may be applied in one coating step and require only a little further treatment such as honing and no galvanic or environmentally questionable processes are employed.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
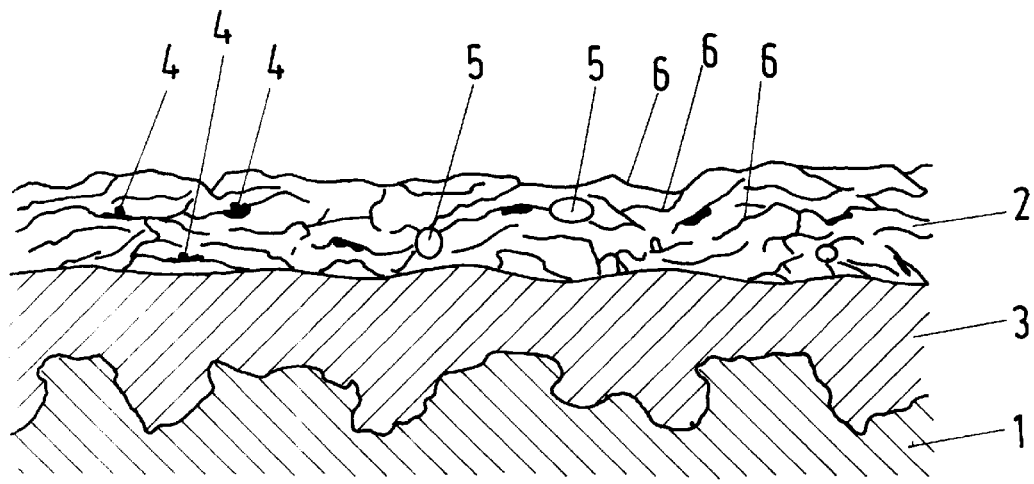
FIG. 1 is a magnified cross-sectional view showing schematically the structure of a representative embodiment of a plasma spray layer applied to a light metal alloy.

The magnified cross-sectional view of FIG. 1 shows a portion of a metal part 1 on which a slide surface 2 affording hydrodynamic lubrication is to be produced, in particular a cylinder liner for a cylinder in the engine block of an internal combustion engine. The engine block 1 is produced from a light metal material such as $AlSi_6Cu_4$, in this instance by pressure casting.

To produce a slide layer suitable to the operating conditions of the cylinder liners, a wear layer 3 is applied to the part 1 by plasma spraying.

FIG. 1 shows the applied wear layer 3 on the part 1 at high magnification and schematically. As shown in FIG. 1, the wear layer 3 is bound to the part 1 by mechanical interlocking which is produced because the wear layer in the liquid state penetrates the unevenness and undercuts in the surface of the part. In these places positive geometrical connections are formed upon solidification of the wear layer.

In addition, shrink stresses build up inside the wear layer 3, leading to positive forced engagement between the wear layer 3 and the surface irregularities of the Part 1.

The wear layer 3 contains inclusions such as impurities 4 and unmelted spray particles 5 and also has comparatively thin oxide layers 6.

The spray powders used to produce the wear layer 3 contain a certain volume percentage of a molybdenum powder while the remainder is composed of a powdered steel. The powdered steel may, for example, consist of iron, molybdenum, chromium, nickel, silicon and boron, which when combined, provide a very hard steel powder. Alternatively, a tool steel alloy consisting or iron, molybdenum, tungsten and chromium may be employed or a low alloy steel, based for example on iron, chromium, manganese and carbon, may be used.

The wear layer may be made by spraying a powder consisting of 20–60% by weight of powdered molybdenum with the balance powdered steel. Especially good results have been obtained using 30–50% of powdered molybdenum and 70–50% of a tool steel alloy powder.

After solidification of the wear layer 3, machining in the form of honing, as disclosed for example in German Offenlegungsschrift No. 44 40 713, reduces the wear layer 3 to a desired final thickness. Advantageously, in this honing operation, the remnants of inclusions such as individual solidified metal droplets, exposed by abrasion, will be extracted from the surface, exposing numerous lubrication pockets 7 in the form of minute isolated cavities as shown in FIG. 3.

Advantageously, the totality of these isolated lubrication pockets 7 form a pressure microchamber system on the slide surface 2 with plateaus 8 of extremely small rugosity separating the lubrication pockets 7. No further steps, such as the use of fluid jets to expose lubrication pockets healed by machining as in the prior art, are required to produce the microchamber system.

Figure 3:
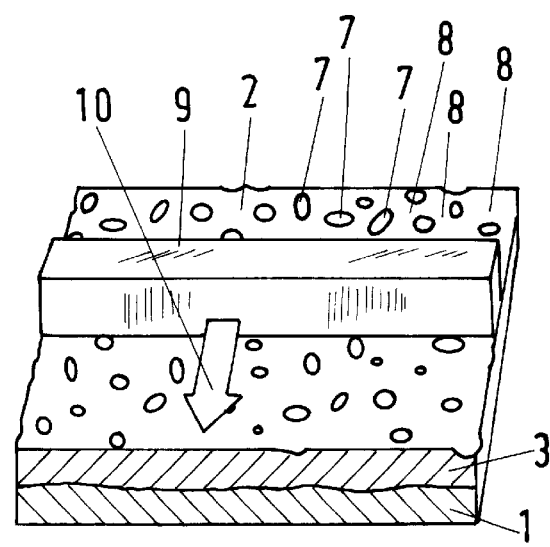
FIG. 3 is a schematic perspective view similar to FIG. 2 illustrating a representative embodiment of a slide surface having pressure microchamber system according to the invention.

FIG. 3 shows a portion of a cylinder lining of a part 1 having a slide surface 2 and a pressure microchamber system formed by lubrication pockets 7 separated by plateaus 8. Schematically, a piston ring segment 9 is shown engaging the slide surface 2 and moving relative to the slide surface 2 with a direction of motion 10 as in operation of the engine. The lubricant collected in the separated lubrication pockets 7 provides a hydrodynamic lubrication by flotation of the piston ring segment 9.

Figure 2:
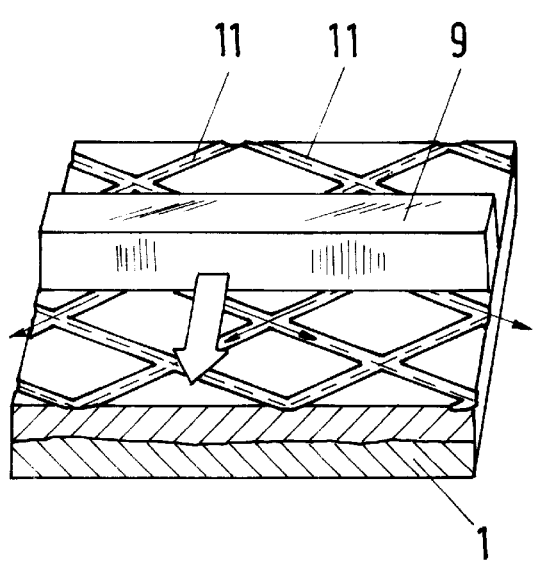
FIG. 2 is a perspective view illustrating schematically a slide surface having a communicating system with limited hydrodynamic lubrication according to the prior art.

In contrast to the slide surface having a microchamber system with isolated pockets as shown in FIG. 3, FIG. 2 shows a slide surface with an open, communicating groove system according to the prior art. In this surface intersecting scores 11, produced by honing, contain lubricant which is merely pushed along ahead of the piston ring in the direction of the arrows by the motion of the piston ring segment 9. This permits only a limited hydrodynamic pressure to build up and, at the edges of the scores 11, mixed friction between the piston ring and the cylinder lining is possible.

With suitable matching of process parameters, in particular of the composition of the wear layer 3 and of the material removed by honing, it is possible to produce a pressure microchamber system affording hydrodynamic lubrication by the method of the invention in a comparatively few and simple steps. The composition of the wear layer has a direct relation to the hardness of the resulting slide surface and the removal of particles by honing may, for example, be increased by increasing the proportion of powdered molybdenum.

The specific rate of removal by honing, that is, the ratio of measured removal during honing to the time required therefor, was found to be high enough in the case of all sprayed layers to permit completion of the honing operation within preassigned time cycles for the fabrication of an engine block having lined cylinders.

For the molybdenum component, a molybdenum essentially as described in U.S. Pat. No. 2,588,422, i.e. a molybdenum alloy with up to about 40% other constituents, may be used. Preferably, however, a molybdenum is used which has at least 90% by weight of molybdenum and, in particular, a molybdenum having other constituents which do not individually exceed 1% is preferred, the molybdenum content preferably being above 95%.

Although the invention has been described herein with reference to specific embodiments many modifications and variations therein will readily occur to those skilled in the art. Accordingly, all such variations and modifications are included within the intended scope of the invention.

We claim:

1. A method for producing a slide surface on a body comprising spraying a mixture containing from about 10 to about 70 wt. % molybdenum and from about 90 to about 30 wt. % of a steel onto a magnesium or aluminum alloy to produce a coating containing inclusions, and machining the coating to remove inclusions and produce a slide surface containing a sufficient number of isolated cavities to provide effective oil retention.

2. A method according to claim 1 wherein the body is a magnesium alloy and the mixture contains from about 20 to about 60 wt. % molybdenum and from about 80 to about 40 wt. % of a steel.

3. A method according to claim 1 wherein the a mixture contains from about 30 to about 50 wt. % molybdenum and from about 70 to about 50 wt. % steel.

4. A method according to claim 1 wherein the steel is an alloy steel.

5. A method according to claim 4 wherein the alloy steel is a tool steel.

6. A method according to claim 5 wherein in the alloy steel used is a tool steel containing iron, molybdenum, tungsten and chromium or a low alloy steel containing iron, chromium, manganese and carbon.

7. A method according to claim 1 comprising producing the slide surface on a cylinder wall in an internal combustion engine.

8. A method according to claim 1 comprising plasma spraying the mixture to produce the slide surface.

9. A method according to claim 1 including machining the coating after it is applied to form the slide surface.

10. A method according to claim 9 wherein the isolated cavities formed in the surface of the slide layer produce a pressure microchamber system for an oil film.

11. A method according to claim 1 wherein the mixture is applied as a powder.

12. A method according to claim 11 wherein the powder is a mixture of molybdenum and steel powders.

13. A reciprocating piston engine comprising an engine block made of magnesium or aluminum alloy having cylinder linings containing a steel-molybdenum coating applied by thermal spraying of a mixture containing from about 10 to about 70 wt. % molybdenum and from about 90 to about 30 wt. % steel wherein the coating has a surface with a plurality of isolated cavities to assure effective oil retention.

14. A reciprocating piston engine to claim 13 wherein the engine block is made of aluminum alloy and the mixture contains from about 20 to about 60 wt. % molybdenum and from about 80 to about 40 wt. % steel.

15. A reciprocating piston engine according to claim 13 wherein the mixture is in the form of powders of the constituents.

* * * * *